United States Patent
Abdelli (10) Patent No.: US 11,698,645 B2
(45) Date of Patent: Jul. 11, 2023

(54) METHOD FOR HOVERING AN AIRCRAFT WITH RESPECT TO AN AXIS WITH A CONTROLLABLE PITCH ANGLE

(71) Applicant: AIRBUS HELICOPTERS, Marignane (FR)

(72) Inventor: Kamel Abdelli, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/842,050

(22) Filed: Jun. 16, 2022

(65) Prior Publication Data
US 2023/0101964 A1    Mar. 30, 2023

(30) Foreign Application Priority Data
Sep. 29, 2021 (FR) ...................... 2110186

(51) Int. Cl.
G05D 1/00 (2006.01)
G05D 1/08 (2006.01)
B64C 27/26 (2006.01)
B64C 27/82 (2006.01)

(52) U.S. Cl.
CPC ........... G05D 1/0858 (2013.01); B64C 27/26 (2013.01); *B64C 2027/8227* (2013.01); *B64C 2027/8236* (2013.01)

(58) Field of Classification Search
CPC .................. G05D 1/0858; B64C 27/26; B64C 2027/8227; B64C 2027/8236; B64C 13/18; B64C 27/57
See application file for complete search history.

(56) References Cited

U.S. PATENT DOCUMENTS

| 11,046,417 B2 * | 6/2021 | Duval | .................... B64C 27/82 |
| 2008/0237392 A1 | 10/2008 | Piasecki et al. | |
| 2010/0243792 A1 | 9/2010 | Queiras et al. | |
| 2012/0153072 A1 | 6/2012 | Eglin et al. | |
| 2013/0175385 A1 | 7/2013 | Eglin | |
| 2013/0327880 A1 | 12/2013 | Certain | |

(Continued)

FOREIGN PATENT DOCUMENTS

| EP | 2966529 A1 | 1/2016 |
| FR | 2943620 A1 | 10/2010 |
| FR | 2959205 A1 | 10/2011 |

(Continued)

OTHER PUBLICATIONS

French Search Report for French Application No. FR2110186, Completed by the French Patent Office, dated Apr. 26, 2022, 8 pages.

*Primary Examiner* — Ian Jen
(74) *Attorney, Agent, or Firm* — Brooks Kushman P.C.

(57) ABSTRACT

A method for hovering an aircraft having at least one wing and at least one rotary wing and at least one propeller, the aircraft comprising an autopilot system. The method comprises keeping the aircraft hovering, with the autopilot system, in the setpoint position, keeping the aircraft hovering in this way comprising controlling, with the autopilot system, a pitch of blades of the at least one propeller irrespective of the setpoint pitch angle and controlling, with the autopilot system, a pitch of blades of the at least one rotary wing as a function at least of the setpoint pitch angle.

14 Claims, 6 Drawing Sheets

(56) References Cited

U.S. PATENT DOCUMENTS

2016/0176522 A1   6/2016  Salesse-Lavergne
2022/0011783 A1*  1/2022  Groden .................. B64C 27/56

FOREIGN PATENT DOCUMENTS

| FR | 2977948 A1 | 1/2013 |
| FR | 2991664 A1 | 12/2013 |
| FR | 3030760 A1 | 6/2016 |

* cited by examiner

METHOD FOR HOVERING AN AIRCRAFT WITH RESPECT TO AN AXIS WITH A CONTROLLABLE PITCH ANGLE

CROSS REFERENCE TO RELATED APPLICATIONS

This application claims priority to French patent application No. FR 21 10186 filed on Sep. 29, 2021, the disclosure of which is incorporated in its entirety by reference herein.

TECHNICAL FIELD

The present disclosure relates to a method for hovering an aircraft with respect to an axis with a controllable pitch angle, and an aircraft applying this method.

BACKGROUND

A helicopter comprises at least one rotary wing and a yaw motion control system. A helicopter may remain stationary in flight. However, the helicopter does not remain in a permanent controlled and managed position.

Indeed, the airframe of a helicopter is made stationary in flight by balancing the force of gravity on the helicopter, the force generated by the wind, the aerodynamic force generated by the rotary wing and the aerodynamic force generated by the yaw motion control system.

Another type of rotorcraft comprises a wing and at least one rotary wing and at least one propeller that are set in permanent motion in flight by a power plant. This rotorcraft may be referred to as a "compound helicopter" insofar as it has a rotary wing like a helicopter and a propeller and a wing like an airplane.

Document US 2008/0237392 describes an aircraft comprising a rotary wing and a wing. The aircraft is also provided with a ducted propeller at the end of a tail boom. The aircraft comprises various control members comprising the blades of the rotary wing and of the propeller as well as various manoeuvring flaps. The aircraft comprises a control system for helping to fulfil a selected operational objective, such as minimizing the fuel consumption or vibrations or indeed maximizing the forward speed or even reducing maintenance costs. Once an operational objective has been selected, the control system applies the appropriate combination of adjustments to the control members in order to fulfil the selected objective in response to the pilot's operation of flight controls.

Document FR 2 959 205 describes a method for controlling and regulating a rotorcraft with propellers at a high and stabilized forward speed.

Document FR 2 977 948 describes a device for the automatic piloting of a rotary-wing aircraft comprising at least one pusher propeller. This device comprises a means for engaging an assisted piloting mode for maintaining an angle of attack connected to a processing unit, the processing unit automatically controlling the collective pitch of the blades of the rotary wing when the assisted piloting mode for maintaining an angle of attack is engaged, in order to keep an aerodynamic angle of attack of the aircraft substantially equal to a reference angle of attack.

Document EP 2 966 529 describes a flight control system for independent control of the speed and altitude, during hovering flight, of a rotorcraft having two counter-rotating rotors and a propeller. The system comprises a pitch attitude reference generator and a longitudinal reference generator. The pitch attitude reference is transmitted to a rotor controller in order to control the rotors. Moreover, a converter converts the pitch attitude reference into a propulsion adjustment. A propeller controller combines the propulsion adjustment and the longitudinal reference in order to control the propeller.

Document FR 2 991 664 describes an automated flight control method for a rotorcraft, allowing the rotorcraft to hold its trajectory by following manual flight controls.

Document FR 2 943 620 A1 describes a method for optimizing the operating point of two propellers of a compound helicopter.

Document FR 3 030 760 A1 describes a conventional helicopter not provided with a wing and at least one propeller.

SUMMARY

The object of the present disclosure is therefore to propose a method for performing hovering flight with a compound helicopter while keeping a reference in view during a heading change, for example a landing zone.

The present disclosure relates to a method for hovering an aircraft, with respect to a reference, the aircraft having at least one wing and at least one rotary wing and at least one propeller, the aircraft comprising an autopilot system controlling a pitch of blades of said at least one rotary wing and a pitch of blades of said at least one propeller during a hovering flight phase in a hovering setpoint position with a controlled setpoint pitch angle.

This method comprises a phase of modifying a setpoint position of the hovering flight, said modification phase comprising generating a movement order with a human-machine control interface, determining, as a function of said movement order, a setpoint lateral speed and a setpoint angular speed about a yaw axis of the aircraft with the autopilot system, and moving the aircraft with the autopilot system with said setpoint pitch angle as a function of the setpoint angular speed and the setpoint lateral speed.

The autopilot system may be of a conventional type, comprising a controller communicating with various sensors in order to control various actuators suitable for modifying, in particular, the pitch of the blades of the rotary wing or wings and of the propeller or propellers.

A compound helicopter according to the present disclosure comprises not only at least one rotary wing but also at least one propeller capable of producing thrust in two opposing directions. According to the method of the disclosure, the autopilot system thus controls the pitch of the blades of the rotary wing or wings and also the pitch of blades of the propeller or propellers in order to automatically balance the aircraft. The propeller or propellers therefore generate a force that is able to counter a forward or reverse force generated by the rotary wing or wings. This method therefore helps keep the aircraft stationary with a pitch angle that can be controlled depending on a pilot's requirements.

The hovering flight phase may be implemented by maneuvering a dedicated interface. Moreover, the hovering flight phase performed automatically by the autopilot system may be described as a supra-automatic mode. Indeed, a basic mode of an autopilot system acts on one control axis which, on a conventional helicopter, may be a pitch control axis, a roll control axis, a yaw control axis or indeed an ascent/descent control axis. A superior mode of an autopilot system acts on two control axes. In this case, the hovering flight phase may be performed by the autopilot system implementing various control loops, possibly slow control loops, in order to act on the four abovementioned control axes in addition to a propulsion control axis via the propeller or propellers.

Hovering flight may therefore be achieved with the aircraft nose up or nose down, as required.

Moreover, the method makes it possible to modify the hovering flight setpoint position by injecting a setpoint lateral speed and a setpoint angular yaw speed into control loops. As a result, the aircraft may automatically tend to move on a circle about a virtual axis and relative to a center of movement, having the setpoint pitch angle. The yaw axis of the aircraft may tend to be moved along a cone having a vertex above the aircraft, this vertex representing the center of movement. Therefore, in the event of a heading change, a pilot can maintain visual contact with a reference situated substantially in line with the virtual axis, for example a landing zone.

This method may help significantly improve a pilot's view towards a reference during a heading change and hovering flight.

The method may further comprise one or more of the following features, taken individually or in combination.

The movement order may be carried by a signal decoded by a controller of the autopilot system. For example, the human-machine control interface comprises a beep+/beep− increment/decrement button that can increase or decrease a setpoint by an increment. Another human-machine control interface may be implemented in a tactical mode by operating a control, such as a rudder bar, the setpoint heading being equal to an objective corresponding to the position of the rudder bar when the pilot stops applying force thereto. A human-machine control interface may comprise a button, for example a rotactor.

The term "signal" denotes, in this description, an electrical, optical, digital or analog signal, for example.

According to a first variant, the movement order may carry the setpoint angular speed, and the determination, as a function of said movement order, of a setpoint lateral speed and a setpoint angular speed about a yaw axis of the aircraft may comprise transforming, with the autopilot system, the setpoint angular speed into the setpoint lateral speed as a function of a setpoint radius.

According to one relation, the setpoint angular speed about the yaw axis is equal to the setpoint lateral speed of the aircraft divided by the setpoint radius.

The controller decodes the movement order in order to deduce therefrom the setpoint angular speed based on the abovementioned relation and deduces the setpoint lateral speed therefrom.

According to a second variant, the movement order may carry the setpoint lateral speed and the determination, as a function of said movement order, of a setpoint lateral speed and a setpoint angular speed about a yaw axis of the aircraft may comprise transforming, with the autopilot system, the setpoint lateral speed into the setpoint angular speed as a function of a setpoint radius.

The controller decodes the movement order in order to deduce therefrom the setpoint lateral speed based on the abovementioned relation and deduces the setpoint angular speed therefrom.

Irrespective of the variant, the method may comprise parameterizing said setpoint radius with a human-machine parameterization interface. Such an interface may comprise a keyboard, a designator, a touch panel, a button, etc.

This parameterization makes it possible to modify the shape of the cone along which the aircraft is moving, for example in order to optimize the pilot's view depending on his or her requirements.

Furthermore, moving the aircraft with the autopilot system may comprise controlling a pitch of blades of said at least one rotary wing with the autopilot system as a function at least of the setpoint pitch angle and the setpoint lateral speed, and controlling a differential pitch component of blades of two rotary members with the autopilot system as a function of the setpoint angular speed, said two rotary members comprising two said rotary wings or two said propellers.

According to one possibility compatible with the preceding possibilities, controlling a pitch of blades of said at least one rotary wing may comprise the following steps:

controlling a current pitch angle with the autopilot system as a function of the setpoint pitch angle, by controlling a longitudinal cyclic pitch component of said pitch of the blades of said at least one rotary wing;

controlling a current lateral speed with the autopilot system as a function of the setpoint lateral speed, by controlling a lateral cyclic pitch component of said pitch of the blades of said at least one rotary wing; and controlling a current altitude with the autopilot system as a function of a setpoint altitude of the setpoint position, by controlling a collective pitch component of said pitch of the blades of said at least one rotary wing, said setpoint altitude being parameterizable with at least one human-machine altitude interface.

The term "altitude" is to be interpreted in the broad sense and refers either to a height or to an altitude as such.

According to one possibility compatible with the preceding possibilities, controlling a current pitch angle with the autopilot system as a function of the setpoint pitch angle may comprise the following steps:

measuring a current pitch angle;

determining a longitudinal cyclic control with a pitch control loop, with a controller of the autopilot system, slaving the current pitch angle to said setpoint pitch angle; and transmitting said longitudinal cyclic control to at least one longitudinal cyclic pitch rotor actuator of said autopilot system, said longitudinal cyclic control carrying a control order controlling a longitudinal cyclic pitch component of said pitch of the blades of said at least one rotary wing.

According to one possibility compatible with the preceding possibilities, controlling a current lateral speed with the autopilot system as a function of a setpoint lateral speed may comprise the following steps:

determining a lateral cyclic control with a lateral control loop, with a controller of the autopilot system, slaving the current lateral speed to the setpoint lateral speed; and transmitting said lateral cyclic control to at least one lateral cyclic pitch rotor actuator of said autopilot system, said lateral cyclic control carrying a control order controlling a lateral cyclic pitch component of said pitch of the blades of said at least one rotary wing.

According to one possibility compatible with the preceding possibilities, controlling a current altitude with the autopilot system as a function of a setpoint altitude may comprise the following steps:

determining a collective rotor control with an altitude control loop, with a controller of the autopilot system, slaving the current altitude to said setpoint altitude; and transmitting said collective rotor control to at least one rotor actuator of said autopilot system, said collective control carrying a control order controlling a collective pitch component of said pitch of the blades of said at least one rotary wing.

According to one possibility compatible with the preceding possibilities, controlling a differential pitch component of blades of two rotary members with the autopilot system may comprise controlling a current angular speed about the yaw axis with the autopilot system as a function of the setpoint angular speed, by controlling the differential pitch component.

For example, and when two propellers are present, arranged to either side of an anteroposterior plane of the aircraft, the pitch of the blades of one propeller may be equal to a collective pitch component plus the differential pitch component, whereas the pitch of the blades of the other propeller is equal to the collective pitch component minus the differential pitch component.

When two rotary wings are present, the pitch of the blades of the two rotary wings may comprise a collective pitch component, a longitudinal cyclic pitch component, a lateral cyclic pitch component and a differential pitch component.

Optionally, controlling a current angular speed about the yaw axis with the autopilot system as a function of the setpoint angular speed may comprise the following steps:

determining a differential control with a differential control loop, with a controller of the autopilot system, slaving the current angular speed to the setpoint angular speed; and transmitting said differential control to at least one heading actuator, said differential control carrying a control order controlling a differential pitch component of said pitch of the blades of the two rotary members.

According to one possibility compatible with the preceding possibilities, moving the aircraft with the autopilot system may comprise controlling a current forward speed with the autopilot system as a function of a setpoint forward speed, by controlling a collective pitch component of said pitch of the blades of said at least one propeller, the setpoint forward speed being zero.

Controlling a current forward speed with the autopilot system as a function of a setpoint forward speed may comprise the following steps:

determining a collective propeller control with a speed control loop, with a controller of the autopilot system, slaving the current forward speed to the setpoint forward speed; and transmitting said collective propeller control to at least one propeller actuator of said autopilot system, said collective propeller control carrying a control order controlling a collective pitch component of said pitch of the blades of said at least one propeller.

Another object of the present disclosure is an aircraft having at least one wing and at least one rotary wing and at least one propeller, the aircraft comprising an autopilot system. The autopilot system is configured to apply the method of the disclosure.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
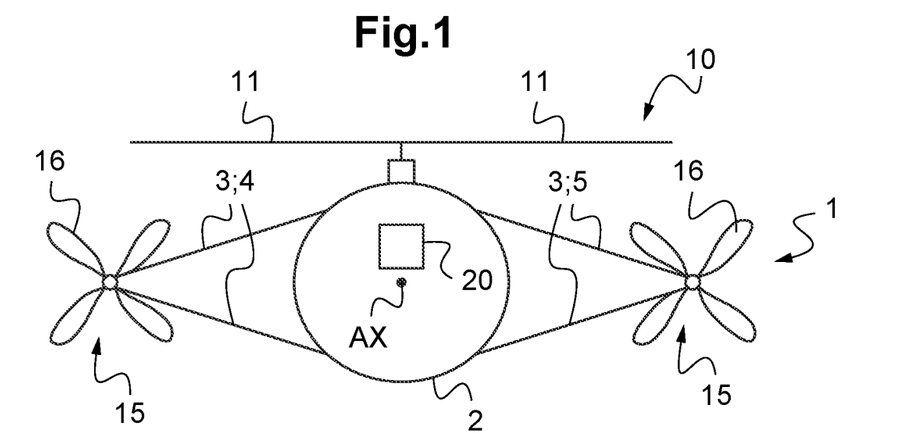
FIG. 1 is an example of an aircraft according to the disclosure having one rotary wing.
Figure 2:
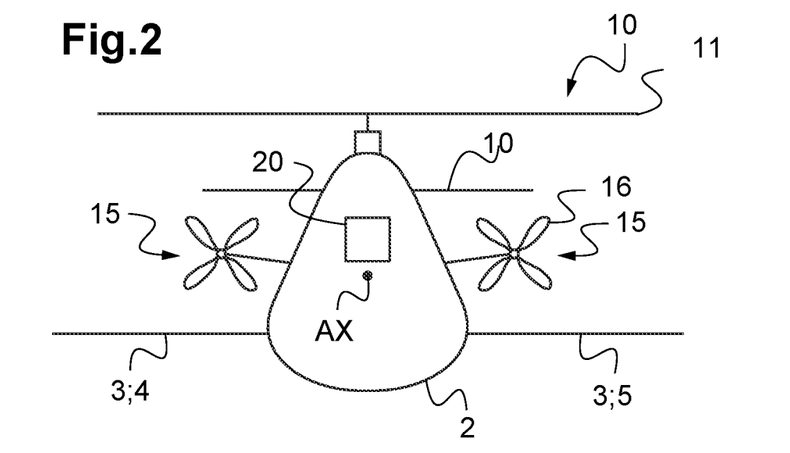
FIG. 2 is an example of an aircraft according to the disclosure having two rotary wings.

FIGS. 1 and 2 show aircraft 1 according to the disclosure.

Regardless of the embodiment, and in reference to FIG. 1, for example, an aircraft 1 may comprise an airframe 2. The airframe 2 extends along a longitudinal reference axis AX from a rear portion towards a front portion.

Moreover, the aircraft 1 comprises at least one wing 3 secured to the airframe 2. The wing 3 comprises two half-wings 4, 5 situated transversely to either side of the airframe 2. Each half-wing 4, 5 may comprise a single lift portion as in FIG. 2 or several lift surfaces as in FIG. 1.

Furthermore, the aircraft 1 is a compound helicopter comprising at least one rotary wing 10 provided with blades 11 and at least one propeller 15 provided with blades 16 rotated by a power plant, which is not shown here so as not to unduly clutter the figures. To this end, this power plant comprises at least one engine and a mechanical interconnection system connecting the engine or engines to the rotary wing or wings 10 and to the propeller or propellers 15. The speeds of rotation of the outputs of the engine or engines, of the propeller or propellers 15, of the rotary wing or wings 10 and of moving members of the mechanical interconnection system are optionally proportional to each other, the proportionality ratio optionally being constant regardless of the flight configuration of the aircraft 1 under normal operating conditions, i.e., except in the event of failure or during testing or training.

FIG. 1 shows an aircraft 1 having a single rotary wing 10 and two propellers 15 arranged to either side of the longitudinal axis AX, for example on the wing 3. In this case, the pitch of the blades 11 of the rotary wing 10 has a collective pitch component, a lateral cyclic pitch component and a longitudinal cyclic pitch component. The pitch of the blades 16 of the propellers 15 has a collective pitch component and a differential pitch component. The pitch of the blades 16 of a propeller 15 may be equal to the sum of the collective pitch component plus the differential pitch component, the pitch of the blades 16 of the other propeller 15 being equal to the collective pitch component minus the differential pitch component.

FIG. 2 shows an aircraft 1 having two rotary wings 10 and at least one propeller 15, such as two propellers 15 according to the example. In this case, the pitch of the blades 11 of each rotary wing 10 may have a collective pitch component, a lateral cyclic pitch component, a longitudinal cyclic pitch component and a differential component. The pitch of the blades 16 of the propeller or propellers 15 has a collective pitch component.

These examples are given by way of illustration only.

Figure 3:
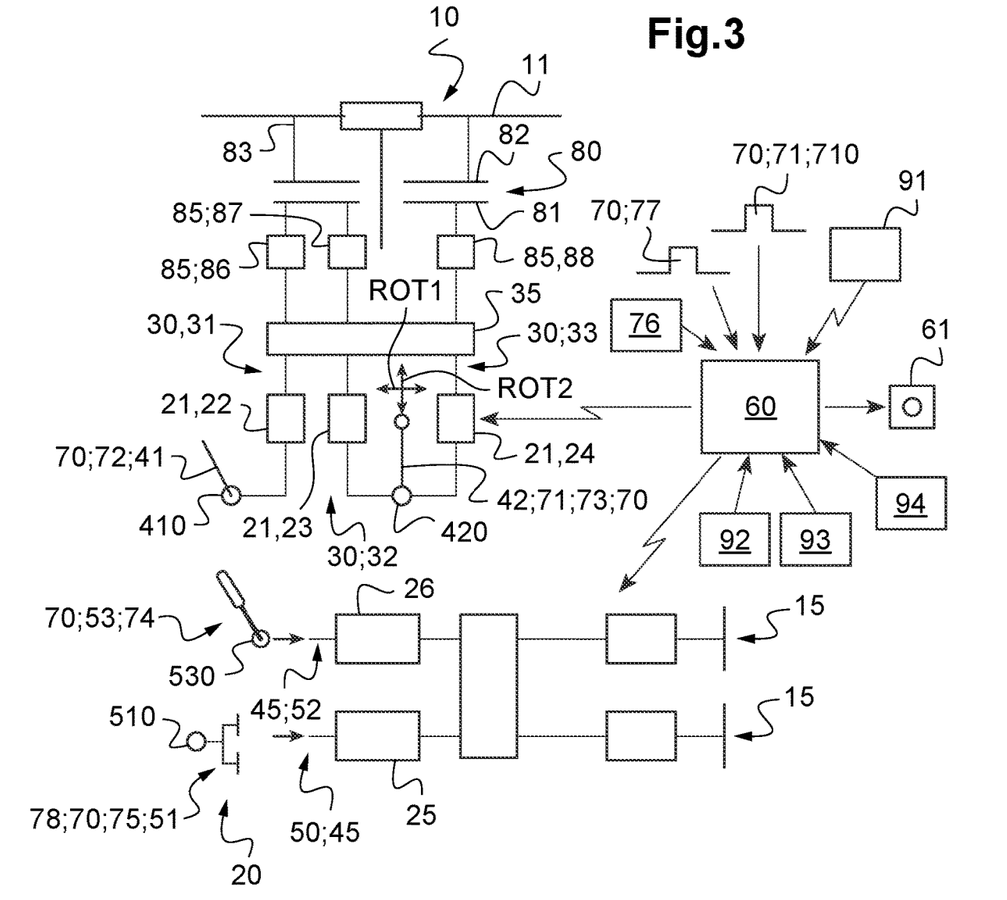
FIG. 3 is an example of an autopilot system applying the method of the disclosure.
Figure 4:
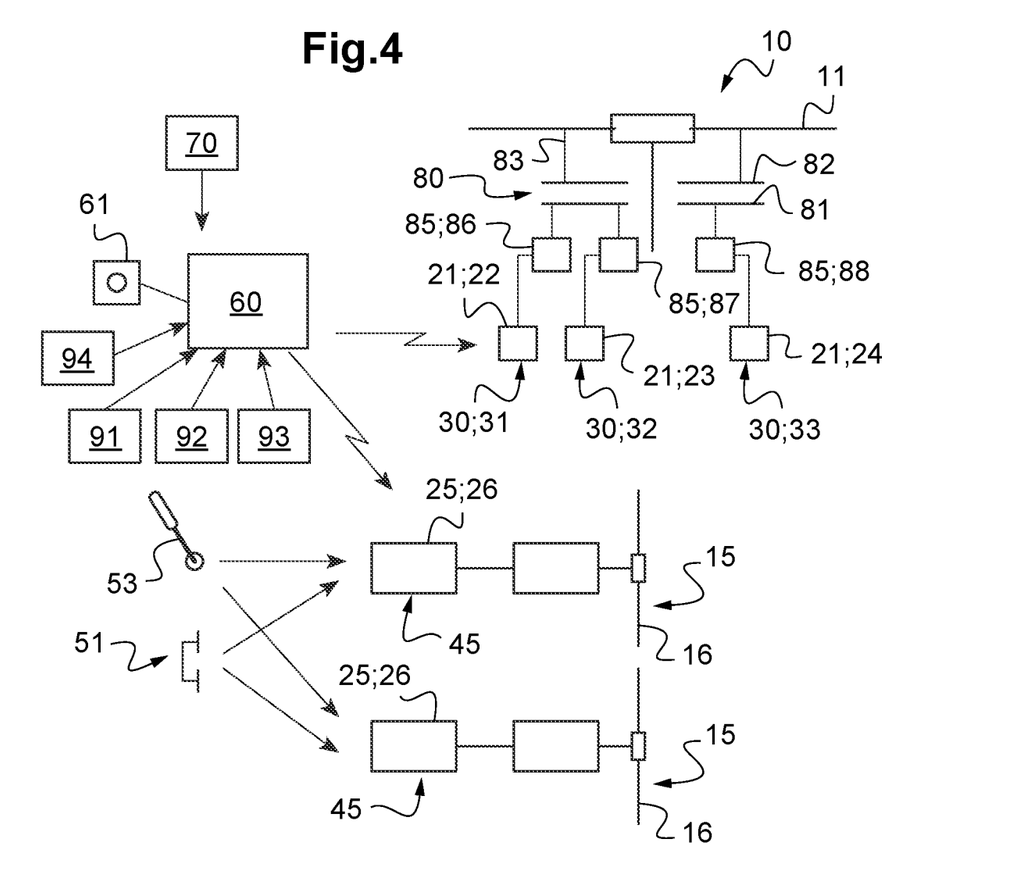
FIG. 4 is an example of an autopilot system applying the method of the disclosure.

Irrespective of the embodiment, the aircraft 1 comprises an autopilot system 20 for carrying out hovering flight with a pitch angle controlled by controlling the pitch of the various blades 11, 16. FIGS. 3 and 4 show examples provided for illustration purposes.

In reference to FIG. 3, the autopilot system 20 may comprise a swashplate system 80 for each rotary wing 10. Such a system 80 usually comprises a first swashplate 82 linked to each blade 11 of the rotary wing 10 by a pitch link 83 and a second swashplate 81 articulated with a plurality of rotor servocontrols 85. The rotor servocontrols 85 may comprise at least one rotor servocontrol 86 acting on the longitudinal cyclic pitch component and at least one rotor servocontrol 87, 88 acting on the lateral cyclic pitch component, the rotor servocontrols 85 being able to act jointly on the collective pitch component and the differential pitch component, if applicable.

The rotor servocontrols 85 are further controlled by control channels 30 that may be electromechanical according to the example of FIG. 3 or electrical according to the example of FIG. 4, each comprising at least one rotor actuator 21.

According to FIG. 3, the control channels may for example lead to a conventional mixing unit 35 connected to the rotor servocontrols 85. A collective control channel 31 comprises at least one collective rotor actuator 22 connected to the mixing unit 35 in order to jointly control the rotor servocontrols 85 in the same manner. At least one longitudinal cyclic control channel 32 may comprise at least one longitudinal cyclic pitch rotor actuator 23 and at least one lateral cyclic control channel 33 may comprise at least one lateral cyclic pitch rotor actuator 24.

Similarly, the aircraft 1 comprises at least one thrust channel 45, which may be electromechanical according to the example of FIG. 3 or electrical according to the example of FIG. 4, for controlling the forward travel of the aircraft 1 via the propeller or propellers 15. The thrust channel 45 comprises at least one propeller actuator 26.

In order to control the yawing motion of the aircraft 1, the aircraft 1 may comprise at least one yaw control channel 50, which may be electromechanical or electrical, for controlling a differential pitch component of the propellers 15 according to the example shown in FIGS. 1, 3 and 4 or of two rotary wings 10 according to FIG. 2. This yaw control channel 50 comprises at least one heading actuator 25. According to the example of FIG. 3, the heading actuator 25 and the propeller actuator 26 are connected to one or more mixing units leading to hydraulic selector valves of the propellers, the pitch of the blades 16 of one propeller 15 being equal to the sum of the orders given by these actuators 25, 26 and the pitch of the blades 16 of the other propeller 15 being equal to the difference between these orders. According to FIG. 4, a given actuator may control a hydraulic selector valve of a propeller 15 and may form a heading actuator 25 and a propeller actuator 26.

The various rotor, propeller, and heading actuators may further be controlled by a controller 60 of the autopilot system 20. By way of example, the controller 60 may comprise at least one processor and at least one memory, at least one integrated circuit, at least one programmable system, or at least one logic circuit, these examples not limiting the scope to be given to the term "controller". The term "processor" may refer equally to a central processing unit (CPU), a graphics processing unit (GPU), a digital signal processor (DSP), a microcontroller, etc.

The controller 60 may be connected via a wired or wireless link with a conventional pitch angle sensor 91, such as an inertial unit, for example, a conventional altitude sensor 92, such as an altimeter, for example, a conventional heading sensor 93 and a conventional sensor 94 for sensing angular speed about the yaw axis.

Irrespective of the preceding features and in reference to FIG. 3, purely for illustrative purposes, the aircraft 1 may comprise various interfaces 70, in particular for controlling the pitch of the blades 11, 16 of the rotary wing or wings 10 and of the propellers 15.

The aircraft 1 may comprise a human-machine parameterization interface 77 for parameterizing a value of a setpoint radius R*. This human-machine parameterization interface 77 may comprise a button or a touch panel or others known devices transmitting a signal to the controller 60 carrying the setpoint radius R*.

A human-machine pitch interface 71 may comprise a cyclic control stick 42 that moves the associated longitudinal cyclic control channel 32 when it is maneuvered in a first direction ROT1. A position sensor 420 may transmit a signal to the controller 60 carrying the movement or the position of the cyclic control stick 42. Additionally, or alternatively, a human-machine pitch interface 71 may comprise a button, a beep+/beep-increment/decrement button 710, a rotator or others known devices transmitting a signal to the controller 60 carrying a pitch setpoint angle.

A human-machine lateral position interface 73 may comprise the cyclic control stick 42 that moves the associated lateral cyclic control channel when it is manoeuvred in a second direction ROT2. The position sensor 420 may transmit a signal to the controller 60 carrying the movement or the position of the cyclic control stick 42. Additionally, or alternatively, a human-machine lateral position interface 73 may comprise at least a button, a beep or others known devices transmitting a signal to the controller 60 carrying a setpoint lateral speed.

A human-machine longitudinal position interface 74 may comprise a thrust lever 53 that moves the thrust channel 45, if applicable. A thrust sensor 530 may transmit a signal to the controller 60 carrying the movement or the position of the thrust lever 53. The human-machine longitudinal position interface 74 may comprise at least a button, a beep or others known devices transmitting a signal to the controller 60 carrying a setpoint longitudinal speed.

A human-machine altitude interface 72 may comprise a collective pitch lever 41 that moves the associated collective control channel when it is manoeuvred. A position sensor 410 may transmit a signal to the controller 60 carrying the movement or the position of the collective pitch lever 41. Additionally, or alternatively, a human-machine altitude interface 72 may comprise at least a button, a beep or others known devices transmitting a signal to the controller 60 carrying a setpoint altitude.

A human-machine control interface 75 may comprise a rudder bar 51 that moves the associated yaw control channel when it is maneuvered. A position sensor 510 may transmit a signal to the controller 60 carrying the movement or the position of the rudder bar 51. Additionally, or alternatively, a human-machine control interface 75 may comprise at least a button, a beep or others known devices transmitting a signal to the controller 60 carrying a setpoint heading.

A mode activation interface 76 may transmit a signal to the controller 60 to activate the hover control mode according to the disclosure. The controller 60 may consequently communicate with an alerter 61, for example an indicator light, which is then illuminated if the hover control mode is activated.

FIGS. 1 to 4 show various architectures and various interfaces. Reference can be made to the literature, if necessary, for examples of aircraft with one or more rotary wing(s), wing (s) and propeller(s).

Figure 5:
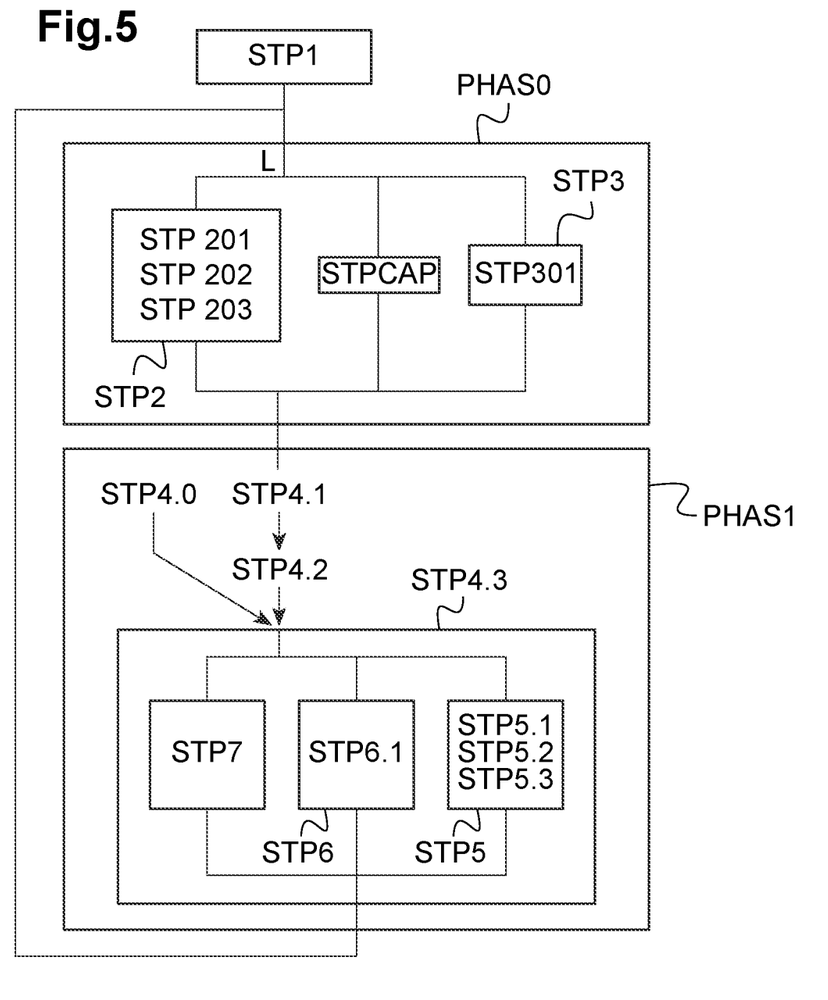
FIG. 5 is a logic diagram showing the method of the disclosure.

Irrespective of these aspects, FIG. 5 shows a logic diagram illustrating the method of the disclosure for modifying a hovering flight phase.

During a hovering flight phase PHAS0, the aircraft 1 is automatically kept in a hovering position at a setpoint position having a setpoint pitch angle that can be adjusted, unlike in the known prior art.

Prior to the hovering flight phase PHAS0, the method may comprise an initialization step STP1. For example, a pilot maneuvers the mode activation interface 76. This mode activation interface 76 transmits a signal to the controller 60 that causes the aircraft 1 to hover relative to a reference. For example, the pilot initiates hovering of the aircraft 1, then maneuvers the mode activation interface 76.

The controller 60 optionally initializes the setpoint pitch angle, the setpoint altitude and/or the setpoint heading, respectively, to the current pitch angle measured with the pitch angle sensor 91, the current altitude measured by the altitude sensor 92 and the current heading measured with a conventional heading sensor 93.

According to another example, the controller 60 initializes the setpoint pitch angle, the setpoint altitude and the setpoint heading respectively to stored or parameterized values, using a conventional interface.

Irrespective of the example and according to one possibility, the setpoint pitch angle may be initialized to a current value of the pitch angle when this current value of the pitch angle lies within a predetermined range of values. However, the setpoint pitch angle may be initialized to a stored value when this current value of the pitch angle does not lie within said range.

Irrespective of the example and according to one possibility, the setpoint altitude may be initialized to a current value of the altitude of the aircraft 1 when the method is initialized, when this current value of the altitude of the aircraft 1 is greater than or equal to a minimum altitude. However, the setpoint altitude is initialized to a stored value when this current value of the altitude of the aircraft 1 is less than the minimum altitude.

Irrespective of the embodiment, a setpoint position to be reached in hovering flight is determined, the setpoint position effectively comprising at least a setpoint pitch angle TANG* that can be parameterized with at least one human-machine pitch interface 71 of the aircraft 1. The setpoint position may thus result from the initialization or alerted from a modification phase PHAS1 for modifying the setpoint position according to the present disclosure described hereinafter.

Irrespective of these aspects, the hovering flight phase PHAS0 comprises keeping the aircraft 1 hovering, with the autopilot system 20, in the setpoint position. The controller 60 controls the rotor actuator or actuators 22, 23, 24, the propeller actuator 26 and the heading actuator 25 in order to keep the aircraft 1 in the required position. Keeping the aircraft in the required position in this way includes controlling STP3, with the autopilot system 20, a pitch of the blades 16 of the propeller or propellers 15 and controlling STP2, with the autopilot system 20, a pitch of the blades 11 of the rotary wing or wings 10.

Figure 6:
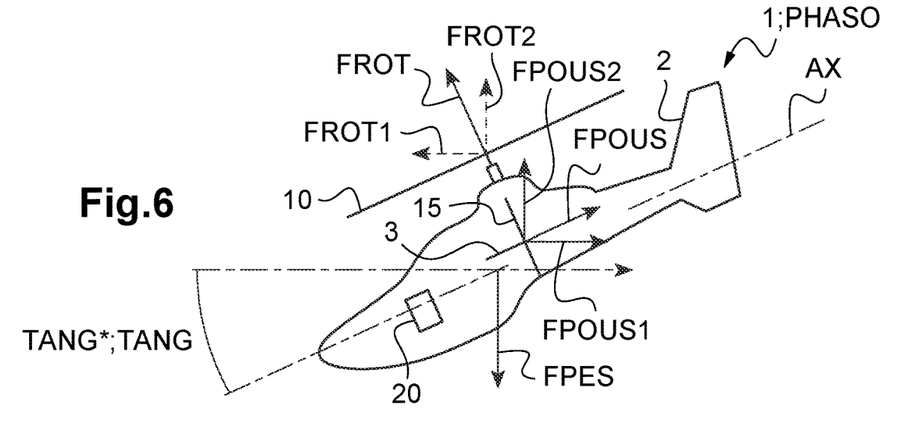
FIG. 6 is an example of nose-down hovering flight.
Figure 7:
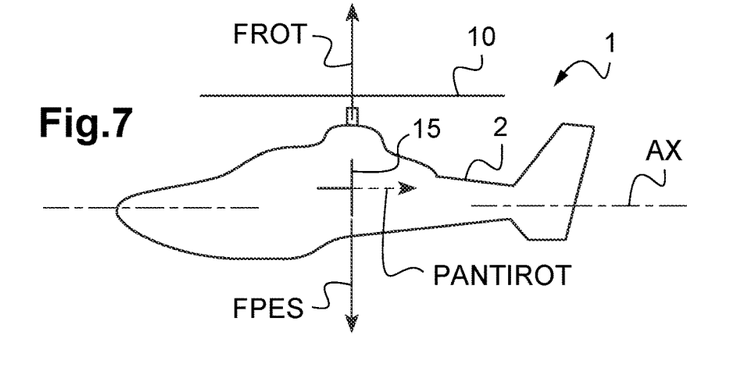
FIG. 7 is an example of flat hovering flight.
Figure 8:
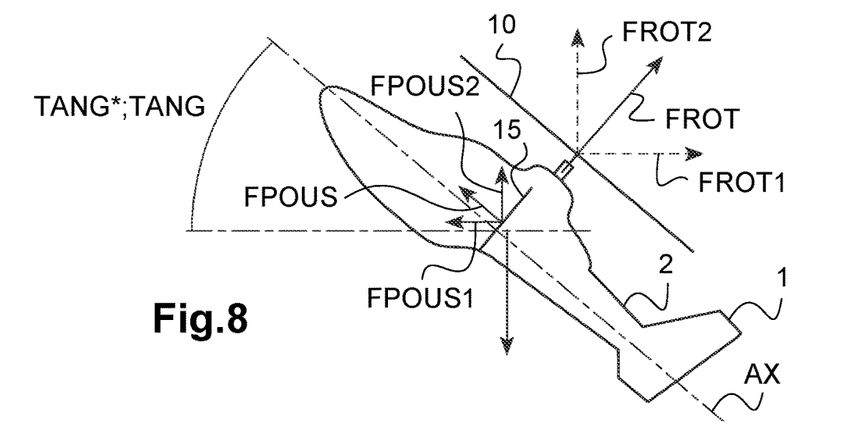
FIG. 8 is an example of nose-up hovering flight.

FIGS. 6 to 8 show this aircraft 1 at various times, respectively with a nose-down pitch angle, a zero pitch angle and a nose-up pitch angle.

FIGS. 6 to 8 show an aircraft 1 with one rotary wing and two propellers, but the operation is similar for an aircraft with two counter-rotating rotary wings according to FIG. 2.

At each instant, the rotary wing or wings 10 together generate an aerodynamic force FROT comprising a first horizontal component FROT1 and a first vertical component FROT2, and the propeller or propellers 15 together generate a thrust force FPOUS comprising a second horizontal component FPOUS1 and a second vertical component FPOUS2. The torque exerted by a rotary wing on the airframe 2 is compensated for, according to the variant, by the other rotary wing 10 or the propellers 15.

According to FIG. 6, the rotary wing or wings 10 and the propeller or propellers 15 are controlled by the controller 60 such that the first horizontal component FROT1 is of the same amplitude as and opposite to the second horizontal component FPOUS1, and the sum of the first vertical component FROT2 and the second vertical component FPOUS2 is opposite to and of the same amplitude as the force of gravity FPES. The aerodynamic force FROT is thus directed upwards and forwards in FIG. 6 whereas the thrust force FPOUS is directed upwards and backwards.

According to FIG. 7, the rotary wing or wings 10 and the propeller or propellers 15 are controlled by the controller 60 such that the first vertical component FROT1 is of the same amplitude as and opposite to the force of gravity FPES. Depending on the variant, the propeller or propellers 15 do not apply thrust or only do so for the purpose of compensating for the torque generated by the rotary wing 10 indicated by the arrow PANTIROT.

According to FIG. 8, the rotary wing or wings 10 and the propeller or propellers 15 are controlled by the controller 60 such that the first horizontal component FROT1 is of the same amplitude as and opposite to the second horizontal component FPOUS1, and the sum of the first vertical component FROT2 and the second vertical component FPOUS2 is opposite to and of the same amplitude as the force of gravity FPES. The aerodynamic force FROT is thus directed upwards and backwards in FIG. 8 whereas the thrust force FPOUS is directed upwards and forwards.

In order to achieve these positions and in reference to FIG. 5, controlling STP2 the pitch of blades 11 of the rotary wing or wings 10 may comprise controlling STP2.1, with the autopilot system 20, via a proportional-integral control or the like, the current pitch angle TANG as a function of the setpoint pitch angle TANG*, by controlling a longitudinal cyclic pitch component of said pitch of the blades 11 of the rotary wing or wings 10.

For this purpose, the method comprises measuring a current pitch angle, for example. A pitch angle sensor 91 thus transmits a signal to the controller 60. The controller 60 then determines a longitudinal cyclic control with a pitch control loop slaving the current pitch angle to said setpoint pitch angle. As long as the current pitch angle is different from said setpoint pitch angle, a longitudinal cyclic control is emitted. This longitudinal cyclic control carries a control order controlling a longitudinal cyclic pitch component of the pitch of the blades 11 of the rotary wing or wings 10, for example a pitch to be achieved or to be modified. The controller 60 then transmits the longitudinal cyclic control to at least one longitudinal cyclic pitch rotor actuator 23 of said autopilot system 20.

This step allows the aircraft 1 to be kept in position inclined at the required pitch.

Controlling STP2 the pitch of blades 11 of the rotary wing or wings 10 may comprise controlling STP2.2, with the autopilot system 20, via a proportional-integral control or the like, a current lateral speed as a function of a zero setpoint lateral speed, by controlling a lateral cyclic pitch component of the pitch of the blades 11 of the rotary wing or wings 10. This step allows the aircraft 1 to be kept in position transversely in relation to the reference.

The controller 60 optionally determines a lateral cyclic control with a lateral control loop slaving the current lateral speed to the setpoint lateral speed. As long as the current lateral speed is different from the setpoint lateral speed, a lateral cyclic control is emitted. The lateral cyclic control carries a control order controlling a lateral cyclic pitch component of the pitch of the blades 11 of the rotary wing or wings 10. The controller 60 then transmits the lateral cyclic control to at least one lateral cyclic pitch rotor actuator 24.

Controlling STP2 the pitch of blades 11 of the rotary wing or wings 10 may comprise controlling STP2.3, with the autopilot system 20, via a proportional-integral control or the like, a current altitude as a function of a setpoint altitude of the setpoint position, by controlling a collective pitch component of the pitch of the blades 11 of the rotary wing or wings 10.

For example, the controller 60 determines a collective rotor control with an altitude control loop slaving the current altitude to the setpoint altitude. As long as the current altitude is different from the setpoint altitude, a collective rotor control is emitted. The collective rotor control carries a control order controlling a collective pitch component of the pitch of the blades 11 of the rotary wing or wings 10. The controller 60 then transmits the collective rotor control to at least one rotor actuator 21.

According to another aspect, controlling STP3 a pitch of blades 16 of the propeller or propellers 15 may comprise controlling STP3.1, with the autopilot system 20, via a proportional-integral control or the like, the current forward speed of the aircraft 1 as a function of a zero forward speed or indeed the setpoint pitch angle, in an anticipatory manner, by controlling a collective pitch component of the pitch of the blades 16 of the propeller or propellers 15. This step allows the aircraft 1 to be kept in position longitudinally in relation to the reference.

The controller 60 optionally determines a collective propeller control with a speed control loop slaving the current forward speed of the aircraft 1 to the setpoint forward speed. As long as the current forward speed is different from the setpoint forward speed, a collective propeller control is emitted. The collective propeller control carries a control order controlling a collective pitch component of the pitch of the blades 16 of the propeller or propellers 15. The controller 60 transmits the collective propeller control to at least one propeller actuator 26.

For the heading control, the aircraft 1 has two rotary members, namely two rotary wings 10 or two propellers 15. Therefore, the autopilot system 20 controls STPCAP a current heading as a function of a setpoint heading of the setpoint position by controlling a differential pitch component of said pitch of the blades 11, 16 of the two rotary members 10, 15.

For example, the controller 60 determines a differential control with a heading control loop, via a proportional-integral control or the like, slaving the current heading to the setpoint heading. As long as this current heading is different from the setpoint heading, a differential control is emitted. The differential control carries a control order controlling a differential pitch component of the pitch of the blades of the two rotary members. The controller 60 then transmits the differential control to at least one heading actuator 25.

Irrespective of how the aircraft 1 is kept hovering, the setpoint position may be modified in flight during a modification phase PHAS1 for modifying the setpoint position.

This modification phase PHAS1 for modifying the setpoint position may comprise only parameterization of the setpoint lateral speed with at least one human-machine lateral position interface 73. As a result, the autopilot system 20 moves the aircraft 1 laterally.

This modification phase PHAS1 for modifying the setpoint position may comprise parameterization of the setpoint forward speed with at least one human-machine longitudinal position interface 74. As a result, the autopilot system 20 moves the aircraft 1 longitudinally.

This modification phase PHAS1 for modifying the setpoint position may comprise modifying the heading of the aircraft 1 by turning about a virtual axis according to the disclosure.

To this end, the modification phase PHAS1 comprises generating STP4.1 a movement order with the human-machine control interface 75. For example, the pilot moves the rudder bar 51.

Therefore, the modification phase PHAS1 comprises determining STP4.2, as a function of the movement order, a setpoint lateral speed VLAT* and a setpoint angular speed OMG* about a yaw axis of the aircraft 1, with the controller 60.

According to a first variant, the movement order carries the setpoint angular speed OMG*. The controller 60 then determines, with a stored law, the setpoint lateral speed VLAT* as a function of the setpoint angular speed OMG* and a setpoint radius R*. For example, the setpoint lateral speed VLAT* is equal to the product of the setpoint angular speed OMG* and the setpoint radius R*.

According to the second variant, the movement order carries the setpoint lateral speed VLAT*. The controller 60 determines, with a stored law, the setpoint angular speed OMG* as a function of the setpoint lateral speed VLAT* and the setpoint radius R*. For example, the setpoint angular speed OMG* is equal to the setpoint lateral speed VLAT* divided by the setpoint radius R*.

This setpoint radius R* is either fixed, or can be parameterised with the human-machine parameterisation interface 77 during a step STP4.0.

Therefore, the modification phase PHAS1 comprises moving STP4.3 the aircraft 1 with the autopilot system 20, keeping this aircraft with the setpoint pitch angle TANG*, as a function of the setpoint angular speed OMG* and the setpoint lateral speed VLAT*.

For example, the autopilot system 20 controls STP5 the pitch of the blades 11 of the rotary wing or wings 10 as a function at least of the setpoint pitch angle TANG* and the setpoint lateral speed VLAT*. Moreover, the autopilot system 20 controls STP7 a differential pitch component of blades 11, 16 of the two said rotary wings 10 or of the two said propellers 15, according to the embodiment.

Controlling STP5 a pitch of blades 11 of the rotary wing or wings 10 may comprise:

controlling STP5.1, with the autopilot system 20, via a proportional-integral control or the like, the current pitch angle TANG as a function of the setpoint pitch angle TANG*, by controlling a longitudinal cyclic pitch component of said pitch of the blades 11 of the rotary wing or wings 10, for example as explained in step STP 2.1;

controlling STP5.2, with the autopilot system 20, via a proportional-integral control or the like, a current lateral speed as a function of the setpoint lateral speed VLAT*, by controlling a lateral cyclic pitch component of the pitch of the blades 11 of the rotary wing or wings 10, for example as explained in step STP 2.2; and controlling STP5.3, with the autopilot system 20, via a proportional-integral control or the like, a current altitude as a function of a setpoint altitude of the setpoint position, by controlling a collective pitch component of the pitch of the blades 11 of the rotary wing or wings 10, for example as explained in step STP 2.3.

Furthermore, controlling STP7 a differential pitch component of blades 11, 16 of the two rotary members with the autopilot system 20 comprises controlling a current angular speed about the yaw axis with the autopilot system 20 as a function of the setpoint angular speed OMG*, by controlling the differential pitch component.

For example, the controller 60 determines a differential control with a differential control loop, via a proportional-integral control or the like, slaving the current angular speed to the setpoint angular speed OMG*. As long as the current angular speed measured is different from the setpoint angular speed OMG*, a differential control is emitted. The differential control carries a control order controlling a differential pitch component of the pitch of the blades 11, 16 of the two rotary members. The controller 60 then transmits the differential control to at least one heading actuator 25.

Furthermore, the modification phase may comprise controlling STP6 a pitch of blades 16 of said at least one propeller 15, which comprises controlling STP6.1, with the autopilot system 20, via a proportional-integral control or the like, the current forward speed of the aircraft 1 as a function of a zero forward speed or indeed the setpoint pitch angle, in an anticipatory manner, by controlling a collective pitch component of the pitch of the blades 16 of the propeller or propellers 15, for example as explained in step STP 2.3.

Figure 9:
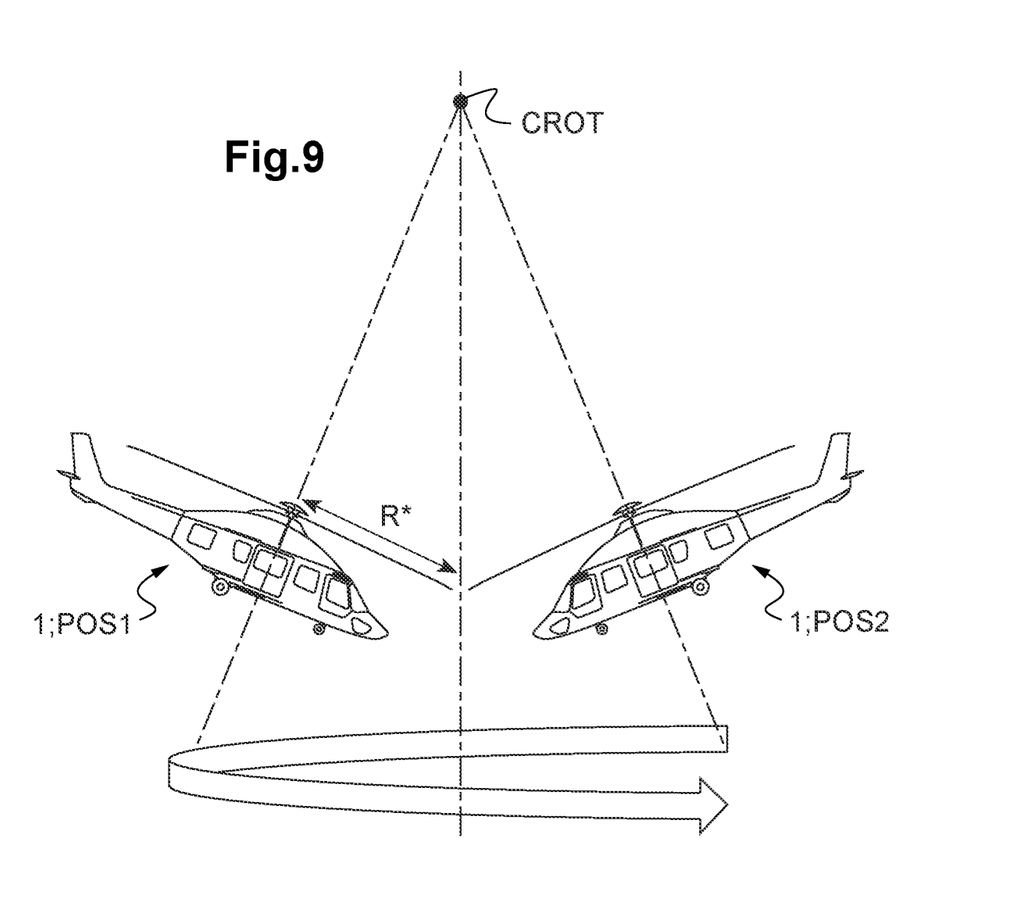
FIG. 9 is a diagram showing the method of the disclosure.

In reference to FIG. 9, this modification phase allows the aircraft 1 to be moved from an initial hovering position POS1 to a final position POS2, following a cone with apex CROT. The setpoint radius R* is a distance from the center of gravity of the aircraft to an axis of symmetry of the cone along the roll axis of the aircraft. By maintaining a nose-down pitch angle, the pilot can keep a reference arranged along the axis of symmetry of the cone in view.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A method for hovering an aircraft having at least one wing and at least one rotary wing and at least one propeller, the aircraft comprising an autopilot system controlling a pitch of blades of the at least one rotary wing and a pitch of blades of the at least one propeller during a hovering flight phase in a hovering setpoint position with a controlled setpoint pitch angle, the method comprising a modification phase for modifying the setpoint position, the modification phase comprising generating a movement order with a human-machine control interface,
   wherein the modification phase comprises determining, as a function of the movement order, a setpoint lateral speed and a setpoint angular speed about a yaw axis of the aircraft, with the autopilot system, and moving the aircraft, with the autopilot system, with the setpoint pitch angle as a function of the setpoint angular speed and the setpoint lateral speed.

2. The method according to claim 1,
   wherein the movement order carries the setpoint angular speed, and the determination, as a function of the movement order, of a setpoint lateral speed and a setpoint angular speed about a yaw axis of the aircraft comprises transforming, with the autopilot system, the setpoint angular speed into the setpoint lateral speed as a function of a setpoint radius.

3. The method according to claim 1,
   wherein the movement order carries the setpoint lateral speed, and the determination, as a function of the movement order, of a setpoint lateral speed and a setpoint angular speed about a yaw axis of the aircraft comprises transforming, with the autopilot system, the setpoint lateral speed into the setpoint angular speed as a function of a setpoint radius.

4. The method according to claim 2,
   wherein the method comprises parameterising the setpoint radius with a human-machine parameterisation interface.

5. The method according to claim 1,
   wherein the moving of the aircraft with the autopilot system comprises controlling a pitch of blades of the at least one rotary wing with the autopilot system as a function at least of the setpoint pitch angle and the setpoint lateral speed, and controlling a differential pitch component of blades of two rotary members with the autopilot system as a function of the setpoint angular speed, the two rotary members comprising two rotary wings or two propellers.

6. The method according to claim 5,
   wherein the controlling of a pitch of blades of the at least one rotary wing comprises the following steps:
   controlling a current pitch angle with the autopilot system as a function of the setpoint pitch angle, by controlling a longitudinal cyclic pitch component of the pitch of the blades of the at least one rotary wing;
   controlling a current lateral speed with the autopilot system as a function of the setpoint lateral speed, by controlling a lateral cyclic pitch component of the pitch of the blades of the at least one rotary wing; and
   controlling a current altitude with the autopilot system as a function of a setpoint altitude of the setpoint position, by controlling a collective pitch component of the pitch of the blades of the at least one rotary wing.

7. The method according to claim 6,
   wherein controlling a current pitch angle with the autopilot system as a function of the setpoint pitch angle comprises the following steps:
   measuring a current pitch angle;
   determining a longitudinal cyclic control with a pitch control loop, with a controller of the autopilot system, slaving the current pitch angle to the setpoint pitch angle; and
   transmitting the longitudinal cyclic control to at least one longitudinal cyclic pitch rotor actuator of the autopilot system, the longitudinal cyclic control carrying a control order controlling a longitudinal cyclic pitch component of the pitch of the blades of the at least one rotary wing.

8. The method according to claim 6,
   wherein controlling a current lateral speed with the autopilot system as a function of a setpoint lateral speed comprises the following steps:

determining a lateral cyclic control with a lateral control loop, with a controller of the autopilot system, slaving the current lateral speed to the setpoint lateral speed; and transmitting the lateral cyclic control to at least one lateral cyclic pitch rotor actuator of the autopilot system, the lateral cyclic control carrying a control order controlling a lateral cyclic pitch component of the pitch of the blades of the at least one rotary wing.

9. The method according to claim 6, wherein controlling a current altitude with the autopilot system as a function of a setpoint altitude comprises the following steps:

determining a collective rotor control with an altitude control loop, with a controller of the autopilot system, slaving the current altitude to the setpoint altitude; and transmitting the collective rotor control to at least one rotor actuator of the autopilot system, the collective control carrying a control order controlling a collective pitch component of the pitch of the blades of the at least one rotary wing.

10. The method according to claim 5, wherein controlling a differential pitch component of blades of two rotary members with the autopilot system comprises controlling a current angular speed about the yaw axis with the autopilot system as a function of the setpoint angular speed by controlling the differential pitch component.

11. The method according to claim 10, wherein controlling a current angular speed about the yaw axis with the autopilot system as a function of the setpoint angular speed comprises the following steps:

determining a differential control with a differential control loop, with a controller of the autopilot system, slaving the current angular speed to the setpoint angular speed; and transmitting the differential control to at least one heading actuator, the differential control carrying a control order controlling a differential pitch component of the pitch of the blades of the two rotary members.

12. The method according to claim 1, wherein moving the aircraft with the autopilot system comprises controlling a pitch of blades of the at least one propeller, which comprises controlling a current forward speed with the autopilot system as a function of a setpoint forward speed, by controlling a collective pitch component of the pitch of the blades of the at least one propeller, the setpoint forward speed being zero.

13. The method according to claim 12, wherein controlling a current forward speed with the autopilot system as a function of a setpoint forward speed comprises the following steps:

determining a collective propeller control with a speed control loop, with a controller of the autopilot system, slaving the current forward speed to the setpoint forward speed; and transmitting the collective propeller control to at least one propeller actuator of the autopilot system, the collective propeller control carrying a control order controlling a collective pitch component of the pitch of the blades of the propeller.

14. An aircraft having at least one wing and at least one rotary wing and at least one propeller, the aircraft comprising an autopilot system, wherein the autopilot system is configured to apply the method according to claim 1.

* * * * *